(12) United States Patent (10) Patent No.: US 7,967,397 B2
Zillmer et al. (45) Date of Patent: Jun. 28, 2011

(54) METHOD FOR OPERATING A HYBRID VEHICLE

(75) Inventors: Michael Zillmer, Sickte (DE); Ekkehard Pott, Gifhorn (DE); Matthias Holz, Lehre (DE); David Prochazka, Libosovice (CS)

(73) Assignee: Volkswagen Aktiengesellschaft, Wolfsburg (DE)

( * ) Notice: Subject to any disclaimer, the term of this patent is extended or adjusted under 35 U.S.C. 154(b) by 443 days.

(21) Appl. No.: 11/562,793

(22) Filed: Nov. 22, 2006

(65) Prior Publication Data

US 2007/0216221 A1 Sep. 20, 2007

Related U.S. Application Data

(63) Continuation of application No. PCT/EP2005/005383, filed on May 18, 2005.

(30) Foreign Application Priority Data

May 24, 2004 (DE) .............. 10 2004 025 830.9

(51) Int. Cl.
 *B60T 8/64* (2006.01)
(52) U.S. Cl. ....................... 303/151; 303/152
(58) Field of Classification Search ............ 303/151, 303/152
 See application file for complete search history.

(56) References Cited

U.S. PATENT DOCUMENTS

| | | | | |
|---|---|---|---|---|
| 5,615,933 A | * | 4/1997 | Kidston et al. ............. | 303/152 |
| 5,842,534 A | | 12/1998 | Frank ...................... | 180/65.2 |
| 6,054,844 A | | 4/2000 | Frank ...................... | 322/16 |
| 2003/0173826 A1 | | 9/2003 | Tazoe et al. ............... | 303/152 |

FOREIGN PATENT DOCUMENTS

| | | |
|---|---|---|
| DE | 4436383 | 4/1995 |
| FR | 2793449 | 11/2000 |

OTHER PUBLICATIONS

International Search Report and Written Opinion for International Application No. PCT/EP2005/005383 (8 pages), Sep. 26, 2005.

* cited by examiner

*Primary Examiner* — Bradley T King
(74) *Attorney, Agent, or Firm* — King & Spalding L.L.P.

(57) ABSTRACT

A hybrid vehicle has an internal combustion engine and an electric motor, in which at least one electric motor converts kinetic energy into electricity in a generator mode and can provide a generator-created braking momentum $M_G$ or a respective braking power $P_G$. When braking is requested with a target value $M_{Soll}$ at a time $t_1$, a total braking momentum M is provided according to the following formula:

$$M_{Soll} = M_G, \text{ if } M_{Soll} \leq M_{Schwell}$$

$$M_{Soll} = M_G + M_F, \text{ if } M_{Soll} > M_{Schwell}.$$

A value $M_{Offset} > 0$ is selected for the braking momentum $M_G$ at the time $t_1$, wherein $M_F > 0$ is a braking momentum provided by a vehicle brake or when braking is requested with a target value $P_{Soll}$ at a time $t_1$, the vehicle is provided with a total braking power P according to the following formula:

$$P_{Soll} = P_G, \text{ if } P_{Soll} \leq P_{Schwell}$$

$$P_{Soll} = P_G + P_F, \text{ if } P_{Soll} > P_{Schwell}.$$

A value $P_{Offset} > 0$ is selected for the braking power $P_G$ at the time $T_1$, wherein $P_F > 0$ is a braking power provided by the vehicle brakes.

18 Claims, 3 Drawing Sheets

METHOD FOR OPERATING A HYBRID VEHICLE

CROSS-REFERENCE TO RELATED APPLICATION

This application is a continuation of co-pending International Application No. PCT/EP2005/005383 filed May 18, 2005 which designates the United States, and claims priority to German application number DE 10 2004 025 830.9 filed May 24, 2004.

TECHNICAL FIELD

The invention relates to a method for operating a hybrid vehicle according to the preamble of the independent claim.

BACKGROUND

In hybrid vehicles two drive units are combined with one another, which provide different types of power for driving the vehicle. The features of an internal combustion engine and an electric motor complement each other particularly well, therefore present hybrid vehicles are predominantly equipped with such a combination. In serial hybrid concepts the drive generally occurs via the electric motor, while the internal combustion engine provides electricity via a generator for charging the electric storage unit and/or for directly feeding the electric motor. However, today parallel hybrid concepts are preferred, in which the vehicle drive is provided both by the internal combustion engine as well as the electric motor.

In parallel hybrid concepts it is possible, in the different operational conditions of a vehicle to use the drive source with the better effectiveness under the given range of rpm-load ration. The electric motor can be connected to the drive train and/or the camshaft of the internal combustion engine in different manners. Preferred possibilities are the connection via a clutch or directly to the camshaft of the motor. Another possibility for a connection is a coupling via a belt drive or a transmission.

The operation of a hybrid vehicle by the electric motor can occur, for example, in operational conditions under a low load only, in which the internal combustion engine has only a low effectiveness. Operational conditions under higher loads can be used to recharge the energy storage unit by the internal combustion engine with its relatively wide range of effectiveness using additional generator operation of the electric motor. During motor operation the electric motor is supplied by the energy storage units. Additionally, a parallel momentum can also be supplied by the internal combustion engine and the electric motor, in order to increase the maximum torque of the entire drive, for example.

Ideally, at least a portion of the energy necessary for driving the vehicle and supplying the electric vehicle circuits is yielded from prior recuperation processes. It is common knowledge that here deceleration phases of the vehicle are used for energy recovery, by providing the necessary braking force of the vehicle by a generator operation of the electric motor to an extent as much as possible, in order to recharge the energy storage unit. Due to the fact that otherwise the energy loss in the brake system of the vehicle is converted into heat, there is a great potential optimizing the consumption of the vehicle drive.

From DE 199 47 922 A1 a method for a recuperating operation of a hybrid vehicle is already known, in which an electric motor in drive operation and/or in the generator operation. In the generator operation kinetic vehicle energy is converted into electricity by the electric motor and stored in an energy storage unit. Here, in a cycle it is first examined if the vehicle is to be driven or braked; after a drive request has been established it is tested if the supply of energy by the energy storage unit is permissible within the limits given. When the supply is allowed the energy is supplied therefrom and provided for the drive of the vehicle. When the supply is not allowed the energy is only provided by the primary drive. When no drive is requested, it is examined if braking is requested. In the case of braking being requested it is examined, if energy may be fed into the energy storage unit within the limits given. When the feeding of energy is allowed here, then kinetic energy of the vehicle is stored in the energy storage unit. When energy may not be fed (to the storage unit), it is fed to an energy disposal unit and subsequently the cycle is repeated. If in the first cycle it is determined that no drive is requested, for example by the accelerator not being operated, it is reviewed if braking is requested, for example by the operation of the brake pedal. If the brake pedal has been operated and energy is allowed to be fed to the energy storage unit, energy is fed to the energy storage unit and stored there.

It is further known from prior art to provide the entire braking momentum to the vehicle when the driver requests braking, beginning with a position of the braking pedal equaling zero, distributed into a portion provided by conventional vehicle brakes, and a portion created by the generator operation of the electric motor. In such a recuperation strategy a portion of the deceleration energy of the vehicle is always converted by the vehicle brakes into heat without being utilized. Further, from prior art an improved method is known, in which a first portion with requirements of only little braking momentum is initially covered entirely by the generator operation of the electric motor. This may occur, for example, in that the leeway of the brake pedal is utilized to provide even a low-level generator momentum of the electric motor. The vehicle brakes are activated only when a level has been exceeded, so that a higher potential of recuperation is utilized compared to the above-described method.

SUMMARY

A method that allows utilization of a higher recuperation potential than prior art in an easy and cost-effective manner is provided.

A method for operating a hybrid vehicle with an internal combustion engine and an electric motor, with at least one electric motor in a generator mode converting kinetic energy of the vehicle into electric power and which can provide a generator-created braking momentum $M_G$ or a respective braking power $P_G$ to the vehicle, comprises the steps of, when braking is requested with a target value $M_{Target}$ at a time $t_1$, a total braking momentum $M_{Total}$ is provided to the vehicle according to the following formula:

$$M_{Total}=M_G, \text{ if } M_{Target} \leq M_{Level}$$

$$M_{Total}=M_G+M_F, \text{ if } M_{Target}>M_{Level}$$

and wherein a value $M_{Offset}>0$ is selected for the braking momentum $M_G$ at the time $t_1$, wherein $M_F>0$ being a braking momentum provided to the vehicle by vehicle brakes or wherein, when braking is requested at a time $t_1$ with a target value $P_{Target}$, the vehicle is provided with a total braking power $P_{Total}$ according to the following formula:

$$P_{Total}=P_G, \text{ if } P_{Target}<P_{Level}$$

$$P_{Total}=P_G+P_F, \text{ if } P_{Target}>P_{Level}$$

and wherein at the time $t_1$ for the braking power $P_G$ a value $P_{Offset}>0$ is selected, wherein $P_F>0$ being a braking power provided to the vehicle by the vehicle brakes.

In an embodiment, the requested braking may occur depending on a requested drive, preferably predetermined by a position and/or speed of motion of the accelerator. In an embodiment, the requested braking may occur at a predetermined release value of the accelerator, preferably at a position=0 of the accelerator. In an embodiment, the requested braking may occur depending on the predetermined position and/or the speed of motion of a brake pedal. In an embodiment, a braking momentum $M_G$ may be impressed according to a predetermined formula, preferably from an initial value $M_{Offset}$ a value $M_0$, at least within a time interval $t_1$+Delta t with Delta t ranging from 2 s to 0.01 s, preferably at a value 2 s, 1 s, 500 ms, or 100 ms. In an embodiment, a filtering of the braking momentum $M_G$ occurs according to a predetermined filter formula for suppressing variations of the braking momentum within a predetermined time interval $t_1$+$t_F$, with $t_F$ ranging from 2 s to 0.01 s, preferably a value of 2 s, 1 s, 500 ms, or 100 ms. In an embodiment, the offset value $M_{Offset}$ can be selected depending on the operating condition of the vehicle, preferably at least one of the parameters vehicle speed $V_{FZG}$, rotation of the camshaft of the internal combustion engine $n_{Mot}$, rotation of the input shaft of the transmission $M_G$, engaged gear of a manual transmission $n_{Gang}$ motor temperature, in particular coolant and/or oil temperature, state of charge (SOC) at least one electric energy storage unit, difference (Target-SOC)–(Current-SOC) of at least one electric storage unit, value of the vehicle deceleration, opening state of a clutch device between internal combustion engine and transmission. In an embodiment, the braking momentum $M_G$ may have the offset-value $M_{Offset}$ for a time interval of no more than 2 s, no more than 5 s, no more than 10 s or no more than 30 s, preferably no more than 60 s and that the offset-value is subsequently terminated. In an embodiment, a shifting pause $t_s$ during the shifting up of a manual transmission provides the vehicle with the braking momentum $M_G$ when the clutch is opened completely or partially. In an embodiment, a control of the value $M_G$ may occur depending on the rotation $n_{Mot}$ and the input camshaft of the transmission $n_G$ in order to synchronize the rotation. In an embodiment, for the braking momentum $M_G$ a value.1toreq.0 can be selected, if the rotation $n_{Mot}$ is lower than the rotation $n_G$. In an embodiment, the vehicle may have a manual transmission. In an embodiment, a control of the braking momentum $M_G$ for synchronizing the rotation may occur according to a predetermined formula. In an embodiment, the vehicle may have an automatic transmission, preferably an automatic converter, direct transmission, or an automatic transmission. In an embodiment, an electric power equivalent to the braking momentum $M_G$ may be at least partially provided to an electric storage device.

BRIEF DESCRIPTION OF THE DRAWINGS

In the following, other embodiments and advantages of the invention are shown, using the description in connection with the drawings, even independent from their mentioning in the claims. It is shown FIG. 1 a schematic representation of essential components of a hybrid drive FIG. 2 various ways of distributing the braking momentum FIG. 3 two diagrams of vehicle speed, generator-created braking momentum, and braking momentum of the vehicle brakes in a recuperation during deceleration.

DETAILED DESCRIPTION

Figure 1:
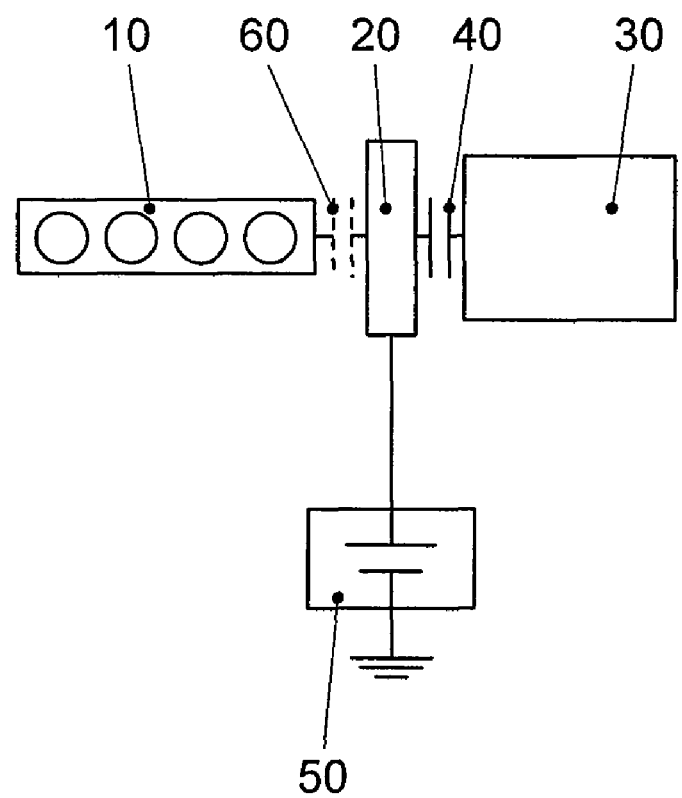

According to an embodiment, during the operation of a hybrid vehicle with an internal combustion engine and an electric motor, when braking is requested having a target value $M_{Target}$ at a time $t_1$, a total braking momentum $M_{Total}$ is provided to the vehicle according to the following formula:

$$M_{Total}=M_G, \text{ if } M_{Target} \leq M_{Level}$$

$$M_{Total}=M_G+M_F, \text{ if } M_{Target}>M_{Level}$$

with a value $M_{Offset}>0$ was selected for the braking momentum $M_G$ at a time $t_1$ and $M_F>0$ being a braking momentum provided to the vehicle by the vehicle brakes.

Here in a generator mode the electric motor converts the kinetic energy of the vehicle into electricity and provides the vehicle with a generator-created braking momentum $M_G$ and/or a braking power $P_G$ Alternatively, in the generator mode a respective braking power $P_G$ may also be provided to the vehicle by the electric motor. According to an embodiment it is provided that a braking request with a target value $P_{Target}$ at a time $t_1$ is provided to the vehicle in a total braking power $P_{Total}$ according to the following formula:

$$P_{Total}=P_G, \text{ if } P_{Target}<P_{Level}$$

$$P_{Total}=P_G+P_F, \text{ if } P_{Target}>P_{Level}$$

with, a value $P_{Offset}>0$ is selected for the braking power $P_G$ at the time $t_1$ and $P_F>0$ being a braking power provided to the vehicle by the vehicle brakes.

In the following, the braking process is primarily described via the term braking momentum; however, it is to be understood that the description using the term braking power is possible just as well and that the invention also includes a method, in which the braking process is described by the term braking power.

In reference to prior art, in the method according to an embodiment the vehicle has a greater generator-created braking momentum at a given braking momentum M and a correspondingly lower braking momentum must be provided by the vehicle brakes. Consequently, during the deceleration of the vehicle a considerably greater energy portion can be recuperated than in conventional methods, because all deceleration and/or braking processes requiring a braking momentum below a certain level occur entirely by the generator mode of the electric motor.

According to an embodiment, the braking request occurs depending on a drive request, preferably determined by the position and/or the speed of the accelerator, because hereby time can be saved in reference to a braking request, which primarily depends on the position and/or the speed of the brake pedal. Further, this allows in a particularly simple manner to avoid a negative influence on the driving behavior by the impressed offset-braking momentum. It is particularly preferred, that the braking request occurs at a predetermined release value of the accelerator, because a release of the accelerator already suggests a rapid potential change to a reduced drive movement of the vehicle.

It is beneficial when the braking request occurs additionally or alternatively depending on a predetermined position and/or speed of a braking pedal.

In a further embodiment, the increase of the braking momentum $M_G$ to the value $M_{Offset}$ occurs according to a predetermined engagement function within a time interval $t_1$ plus Delta t, with Delta t ranging from 2 seconds to 0.01 seconds, preferably having a value of 2 s, 1 s, 500 ms, or 100 ms. Further it is provided to conduct a filtering of the braking momentum $M_G$ for suppressing variations in the braking momentum according to a predetermined filter function within a predetermined interval $t_1$ and $t_f$. Using these further developments an increased mechanical stability during the deceleration of the vehicle and an improved driving comfort is to be achieved.

In another embodiment, it is provided for the braking momentum $M_{Offset}$ to be selected depending on the operational state of the vehicle, preferably on at least one of the parameters vehicle speed $v_{fzg}$, rotation of the camshaft of the internal combustion engine $n_{Mot}$, rotation of the drive shaft of the transmission $n_G$, the gear engaged in a manual transmission $n_{Gang}$, or the opening condition of a clutch between an internal combustion engine and a transmission, in order to ensure an acceptable driving comfort.

In another embodiment, the braking momentum $M_G$ is provided to the vehicle during a shifting pause $t_s$ when shifting up the manual transmission when a clutch is open entirely or partially, in order to avoid or reduce otherwise occurring loss of energy during the synchronization of the rotation.

It can be particularly preferred to provide the electric storage unit at least partially with electricity equivalent to the braking momentum $M_G$.

In FIG. 1, in a schematic representation, essential components of a hybrid drive are shown for a hybrid vehicle otherwise not shown. An internal combustion engine 10 and an electric motor 20 are connected to a transmission 30 via a clutch 40, said transmission being coupled to at least one wheel of the hybrid vehicle, not shown in FIG. 1. The electric motor 20 is electrically connected to an electric energy storage unit 50, for example a rechargeable battery or the like. Optionally the coupling between the internal combustion engine 10 and the electric motor 20 may also occur via a clutch 60. Alternatively, if no clutch is integrated between the internal combustion engine 10 and the electric motor 20, they are located on a common shaft. Further, the hybrid vehicle has a brake system with conventional, preferably hydraulic vehicle brakes. A motor control unit, not shown, receives control signals and other values concerning operating parameters of the hybrid vehicle from control sensors, not shown, in particular concerning an accelerator and a brake pedal module.

The hybrid vehicle may represent a semi-hybrid vehicle with an electric power ranging from 7 to 20 KW, in which the electric motor 20 is primarily used to start the internal combustion engine 10, generator functions and/or recuperation, as well as additional torque. In another embodiment it may also represent a full hybrid vehicle with power ranging from 25 to 50 KW, the electric motor 20 temporarily providing the entire vehicle drive.

The drive using the electric motor 20 can be provided in operational ranges of only little load, for example, when the internal combustion engine 10 has only a low level of effectiveness. Operational ranges with higher loads are used to recharge the electric energy storage unit 50 by the additional generator operation of the electric motor 10 using the internal combustion engine 10 with its relatively high effectiveness. During operation by the electric motor 20 said motor is fed by the electric energy storage 50. Further, a parallel release of momentum by the internal combustion engine 10 and the electric motor 20 may occur, preferably in order to increase the maximum torque of the entire drive.

The motor control device includes, as generally known, some or more micro processors, data storage units, and interfaces as well as devices, by which, depending on the control signals of the sensors, the overall torque is determined, which is provided by the internal combustion engine 10 and the electric motor 20 and is at least partially provided to the transmission 30. The coupling between the internal combustion engine 10 and the electric motor 20 preferably allows both a negative as well as a positive transmission of torque between these two components.

Preferably at least a portion of the energy to be provided both for driving the hybrid vehicle as well as supplying the electric vehicle circuit is yielded from previous recuperation processes. Here, deceleration phases of the vehicle are used for energy recovery, with the necessary braking power of the vehicle being created to a portion as great as possible by a generator operation (generator mode) of the electric motor 10 for charging the energy storage unit 50. Due to the fact that said energy otherwise would be converted into access heat in the braking system of the vehicle, this presents a great potential for a vehicle operation optimizing consumption. The use of a variable braking system would be ideal, which distributes the braking power such, that a maximum portion is created by the generator operation of the electric motor 10 and only when a maximum braking momentum is exceeded conventional vehicle brake would be activated. The electric-mechanical or electric-hydraulic braking systems necessary here are very elaborate and expensive. The method according to an embodiment allows an efficient adaptation of the recuperation concept to conventional, preferably hydraulic braking systems.

For reasons of simplification, in the following the braking process is described via the term of braking momentum, yet it is understood that in an equivalent manner a description using the term braking power would be possible, too. During operation of the vehicle, for example a conversion of braking moments into braking power may occur via curve lines stored in a motor control device.

According to an embodiment, when braking is required with a target value $M_{Target}$ at a time $t_1$, the vehicle is provided with a total braking momentum $M_{Total}$ according to the following formula:

$$M_{Total} = M_G, \text{ if } M_{Target} \leq M_{Level}$$

$$M_{Total} = M_G + M_F, \text{ if } M_{Target} > M_{Level}$$

with a value $M_{Offset} > 0$ being selected for the braking momentum $M_G$ at the time $t_1$ and $M_F > 0$ being a braking momentum provided to the vehicle by the vehicle brakes.

In the configuration of FIG. 1 the braking momentum MG provided to the vehicle is transferred to a camshaft, not shown, via a clutch 40. As generally known per se, here the electric energy developing is provided for the electric storage unit 50. It is understood that the method according to an embodiment may be combined with braking management concepts known per se, preferably ABS, ASR, brake assistant, or the like. Respective control structures are preferably implemented in a motor control unit and/or the braking control device.

Preferably the request for braking occurs depending on a driving request. Preferably the driving request is transmitted by a position and/or motion speed of an accelerator, which preferably is detected by an accelerator module. As usual, the driver of the vehicle sets a position and/or a motion speed of the accelerator at a time $t_1$. When the driver removes his foot from the accelerator, according to an embodiment, a target value $M_{Target}$ of a requested braking is determined, with the electric motor 10 providing the vehicle with the braking momentum $M_G$ in a generator mode, if $M_{Target} \leq M_{Level}$. Further, according to an embodiment, at the time $t_1$ the total braking momentum $M_{Total}$ is exclusively determined by the value $M_G$, with $M_G$ having the value $M_{Offset} > 0$. If $M_{Target} < M_{Level}$, the vehicle brakes additionally provide the vehicle with a braking momentum $M_F > 0$. The target value $M_{Target}$ is preferably limited by the value $M_{Max}$, in order to prevent any physically set limits being exceeded, for example temperatures of the brake system.

In an exemplary embodiment the requested braking depends on a predetermined position and/or speed of motion of the brake pedal.

It is particularly preferred if already at a position of the brake pedal equaling 0 a generator momentum $M_{Offset}$ is provided for the vehicle. In order to illustrate this embodiment in FIG. 2 a total braking momentum $M_{Total}$ is shown depending on a position PW of the brake pedal, with a maximum braking momentum being marked $M_{Max}$. In a position of the brake pedal=0 an offset value $M_{Offset}$ is already impressed. Until the limit S2 is reached, the following applies:

$$M_{Total} = M_G.$$

When the pedal position PW1 is equivalent to the target value $M_{Target}$, the recuperation potential RK is given according to an embodiment. In the brake pedal position PW1 the recuperation potential RK is lower than the total momentum $M_{Total}$, because in the position PW1 the limit S2 has already been exceeded. It is understood that in a particularly simple embodiment the limit S2 may be independent from the position PW of the pedal.

Figure 2:
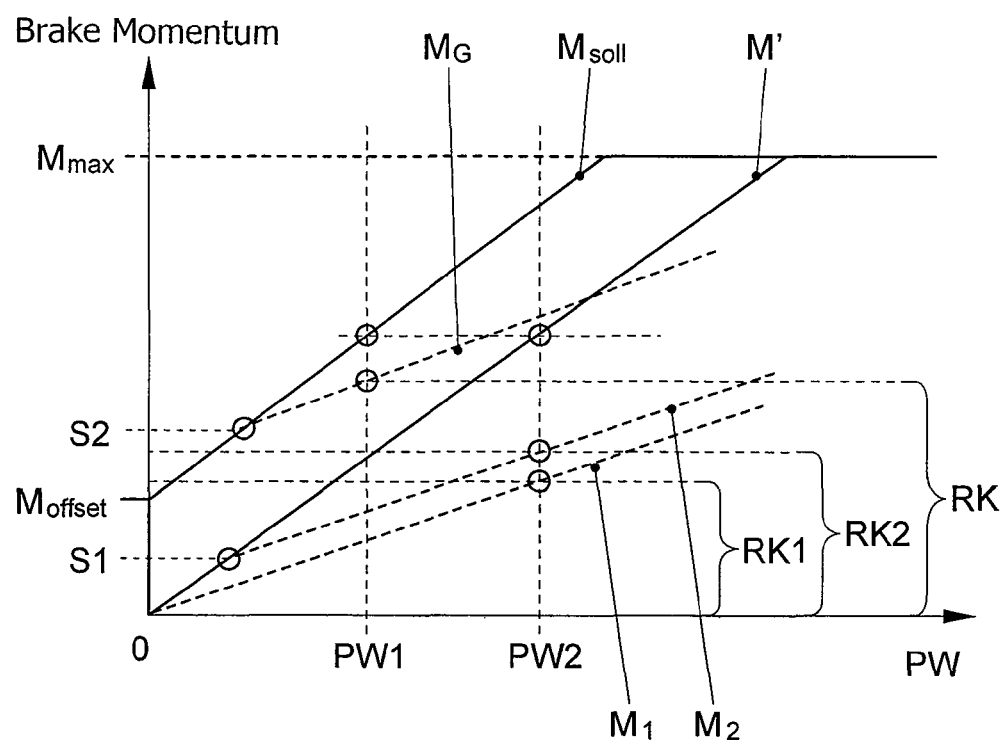

In order to compare the distribution of momentum according to an embodiment, in FIG. 2 the two variants of the recuperation strategy known from prior art are shown as well. In the variant marked $M_1$, when the driver requests braking, beginning at the brake pedal position 0, the total braking momentum $M_{Total}$ is distributed to a portion created by the generator operation of the electric motor, $M_1$, and a portion created by conventional vehicle brakes. The sum of both braking momentums results in the total braking momentum M'. In a pedal position PW2 a recuperation potential RK1 is accessed. $M_2$ marks a second variant, in which here a first portion with a low braking request is initially covered exclusively by the generator operation of the electric motor. For this purpose, for example a leeway of the brake pedal can be used, in which already a low generative momentum of the electric motor is created. The vehicle brakes are activated only when the limit S1 is exceeded. At a position PW2 of the brake pedal the total braking momentum provided by the curve M' accesses a greater recuperation potential RK2 than the first variant. It is further discernible from the representation that the method according to an embodiment can yield an even greater recuperation potential than in the second variant.

The method according to an embodiment entails the risk of distinct negative influences on the driving behavior when the braking momentums are created at the time $t_1$. In order to avoid such influences, in the following preferred ways for engaging the braking momentums $M_G$ are discussed. First it must be stated, though, that in a requested braking depending on a driving request, in particular a predetermined release value of the accelerator, the driver already expects a rapid change to a reduced drive of the vehicle. In order to avoid excessive jerks and/or induced vibrations in the drive train it is further provided, that the engagement of the braking momentum $M_G$ generally occurs according to a predetermined engagement formula from an initial value $M_{Offset}$ to a value $M^O$ within a time interval $t_1$ plus Delta t, with Delta t ranging from 2 s to 0.01 s. It is preferred, when Delta t has a value of 2 s, 1 s, 500 ms or 100 ms. Preferred is an engagement formula with a ramp-like increase depending on time. Further the braking moment $M_G$ can be filtered according to a predetermined filter formula for suppressing variations in braking momentums within a predetermined time interval $t_1$ plus $t_f$, $t_f$ ranging preferably from 2 s to 0.01 s and preferably having a value of 2 s, 1 s, 500 ms, or 100 ms. Further, the offset value $M_{Offset}$ is impressed for a time interval of no more than 2 s, no more than 5 s, no more than 10 s, no more than 30 s, and preferably no more than 60 s and subsequently preferably be terminated.

The amount of the offset-value $M_{Offset}$ is preferably set depending on the operational state of the vehicle, in order to ensure an acceptable driving comfort. Preferably the offset-value $M_{Offset}$ is selected depending on at least one of the parameters vehicle speed $V_{FZG}$, rotation of the camshaft of the internal combustion engine $n_{Mot}$, gear engaged in a manual transmission $n_{Gang}$ or opening condition of a clutch between internal combustion engine and transmission, a motor temperature, in particular coolant and/or oil temperature, a state of charge (SOC) of the electric energy storage unit, the difference between the target value and the actual state of charge of the energy storage unit, or the value of the vehicle deceleration. Preferably at high vehicle speeds with high driving resistances and/or high motor rotations $n_{Mot}$ with high motor inertias, relatively higher values of $M_{Offset}$ are preset. Accordingly it is preferred, in low values of the vehicle speed $V_{FZG}$ and/or the motor rotation $n_{Mot}$ to adjust low values $M_{Offset}$. In this case, by a higher transmission ratio in lower gears, generally only lower values of $M_{Offset}$ are permissible. It is understood that identical embodiments also apply for the value $M^O$. Further, the value of the generator-created braking momentum $M_G$ is selected generally at least depending on the parameters mentioned. In particular it must be pointed out, that depending on the position and/or the speed of motion of the accelerator and/or the braking pedal the value of $M_G$ and $M_{Offset}$ and/or $M^O$ can be selected.

Figure 3:
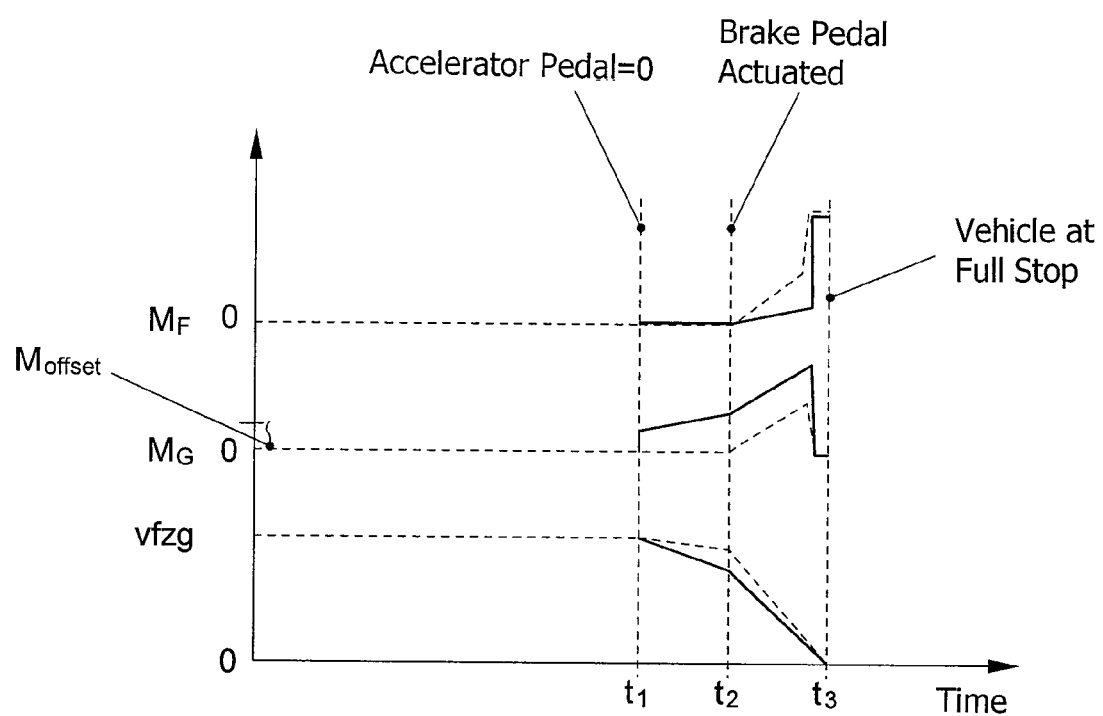

In FIG. 3, another method according to an embodiment for impressing a generator-created braking momentum depending on time is shown, with a conventional method being illustrated in dot-dash lines for comparison. Here it is assumed that between the electric motor and the internal combustion engine no clutch is implemented and/or if a clutch is implemented it is not open. Further, in addition to $M_G$, the vehicle speed $V_{FZG}$ and a vehicle brakes-braking momentum M is shown depending on time. According to FIG. 3 a deceleration of the vehicle occurs out of the driving state with a constant speed to full stop at the time $t_3$.

At the time $t_2$ the driver activates the brake pedal and subsequently decelerates the vehicle to full stop at the time $t_3$. In conventional cases, here a respectively generator-created braking momentum is provided. Here it is shown that after exceeding a limit S1 a distribution of the braking momentum between the electric motor and the vehicle brakes is performed. As commonly known, shortly before reaching full stop the generator-created braking momentum is terminated. Subsequently the deceleration occurs entirely by the vehicle brakes. Here it is beneficially considered that the gears must be disengaged when the minimally permitted rotation of the internal combustion engine is no longer reached.

According to an embodiment, as early as at the time $t_1$, when the driver removes his foot from the accelerator, i.e. the accelerator being released, a generator-created braking momentum $M_G$ is impressed with an offset-value. At the time $t_2$, i.e. at the time the driver operates the brake pedal, a higher generated braking momentum $M_G$ is impressed and accordingly the braking momentum $M_F$ to be impressed by the vehicle brakes is smaller than in conventional methods.

In a particularly advantageous embodiment of the method according a generator-created braking momentum $M_G$ is also impressed during the release of the accelerator in a shifting pause, when shifting up a manual transmission in a completely or partially opened clutch. Here, it is utilized that the motor rotation and/or the camshaft rotation of the internal combustion engine $n_{Mot}$ must anyways be reduced for shifting from a lower gear into a higher gear. According to this further embodiment the energy loss otherwise created during the synchronization of the rotation, for example in the transmission, can largely be avoided. Preferably the generator-created braking momentum is controlled such, that a force-fitting connection is made to a higher gear with an almost identical rotation of the camshaft of the motor and the input shaft of the transmission.

The use of the recuperation strategy according to an embodiment in an upward shifting-up process is particularly suited for manual transmissions, however it may also be used in automatic transmissions, such as automatic converters, direct transmissions, automated manual transmissions or the like during the shifting of gears.

In an automatic transmission, according to an embodiment, the generator-created braking momentum $M_G$ is controlled by the integration into the shifting strategy. In a manual transmission for controlling the braking momentum $M_G$ of the shifting pause $t_s$ a predetermined formula is used, according to which $M_G$ varies. Preferably such a formula is determined using typical shifting processes and is implemented in the motor control device of the vehicle.

Due to the fact that the motor rotation and/or the rotation of the camshaft of the internal combustion engine $n_{Mot}$ may drop below the rotation of the input shaft of the transmission $n_{Gang}$ during the shifting process and/or the shifting pause, it is provided, that generator-created braking moments $M_G$ are reduced to 0 and/or appropriately terminated as soon as said event occurs. If necessary, the increase of motor rotation is also possible using the electric motor, if the rotation $n_{Mot}$ is lower than the rotation $_{MG}$.

LIST OF REFERENCE CHARACTERS 10 internal combustion engine
20 electric motor
30 transmission
40 clutch
50 energy storage unit
60 optional clutch
$M_{Total}$ total braking momentum
$M_G$ generator-created braking momentum
$M_1$, $M_2$, $M$ progression of torques according to prior art
$RK_1$, $RK_2$, $RK$ recuperation potential
$M_0$ generator-created braking momentum
$M_F$ braking momentum of vehicle brakes

What is claimed is:

1. A method for operating a hybrid vehicle with an internal combustion engine, an electric motor, and a brake pedal, with at least one electric motor in a generator mode converting kinetic energy of the vehicle into electric power and which can provide a generator-created braking momentum $M_G$ or a respective braking power $P_G$ to the vehicle, the method comprising the steps of:

when braking is requested with a target value $M_{Target}$ at a time $t_1$, a total braking momentum $M_{Total}$ is provided to the vehicle according to the following formula:

$M_{Total}=M_G$, if $M_{Target} \leq M_{Level}$ $M_{Total}=M_G+M_F$, if $M_{Target} > M_{Level}$ and wherein a value $M_{Offset} > 0$ is selected for the braking momentum $M_G$ at the time $t_1$, wherein $M_F > 0$ being a braking momentum provided to the vehicle by vehicle brakes, wherein the braking momentum $M_G$ is applied during a shifting pause $t_S$ during the shifting up of a manual transmission when the clutch is opened completely or partially, wherein the braking momentum $M_G$ during the shifting pause is determined based on a rotation of a motor camshaft $n_{Mot}$ and a rotation of an input shaft of a transmission $n_G$ in order to synchronize the rotation;

or wherein, when braking is requested at a time $t_1$ with a target value $P_{Target}$, the vehicle is provided with a total braking power $P_{Total}$ according to the following formula:

$P_{Total}=P_G$, if $P_{Target} \leq P_{Level}$ $P_{Total}=P_G+P_F$, if $P_{Target} > P_{Level}$ and wherein at the time $t_1$ for the braking power $P_G$ a value $P_{Offset} > 0$ is selected, wherein $P_F > 0$ being a braking power provided to the vehicle by the vehicle brakes;

such that for positive positions of the brake pedal below a threshold position, the total braking momentum $M_{Total}$ is provided to the vehicle only by generator-created braking momentum $M_G$ and not by momentum from the vehicle brakes $M_F$, wherein the braking power $P_G$ is applied during a shifting pause $t_S$ during the shifting up of a manual transmission when the clutch is opened completely or partially, wherein the braking power $P_G$ during the shifting pause is determined based on a rotation of a motor camshaft $n_{Mot}$ and a rotation of an input shaft of a transmission $n_G$ in order to synchronize the rotation.

2. The method according to claim 1, wherein the requested braking occurs depending on a requested drive predetermined by at least one of: a position and a speed of motion of an accelerator pedal.

3. The method according to claim 2, wherein the requested braking occurs at a predetermined release value of the accelerator pedal.

4. The method according to claim 1, wherein the requested braking occurs depending on at least one of a predetermined position and a speed of motion of the brake pedal.

5. The method according to claim 1, wherein the braking momentum $M_G$ is impressed according to a predetermined formula, from an initial value $M_{Offset}$ to a value $M^0$, at least within a time interval $t_1$+Delta t with Delta t ranging from 2 s to 0.01 s.

6. The method according to claim 1, wherein a filtering of the braking momentum $M_G$ occurs according to a predetermined filter formula for suppressing variations of the braking momentum within a predetermined time interval $t_1+t_F$, with $t_F$ ranging from 2 s to 0.01 s.

7. The method according to claim 1, wherein the offset value $M_{Offset}$ is selected depending on the operating condition of the vehicle according to at least one of the parameters of vehicle speed $v_{FZG}$, rotation of the camshaft of the internal combustion engine $n_{Mot}$, rotation of the input shaft of the manual transmission $M_G$, engaged gear of the manual transmission $n_{Gang}$, motor temperature, coolant and/or oil temperature, state of charge (SOC) of at least one electric energy storage unit, difference (Target-SOC)−(Current-SOC) of at least one electric storage unit, value of the vehicle deceleration, and opening state of a clutch device between internal combustion engine and transmission.

8. The method according to claim 1, wherein the braking momentum $M_G$ has the offset-value $M_{Offset}$ for a time interval selected from an interval of no more than 2 s, no more than 5 s, no more than 10 s or no more than 30 s, and no more than 60 s and that the offset-value is subsequently terminated.

9. The method according to claim 1, wherein for the braking momentum $M_G$ a value $\leq 0$ is selected, if the rotation of the camshaft $n_{Mot}$ is lower than the rotation of the input shaft $n_G$.

10. The method according to claim 1, wherein a control of the braking momentum $M_G$ occurs according to a predetermined formula.

11. The method according to claim 1, wherein an electric power equivalent to the braking momentum $M_G$ is at least partially provided to an electric storage device.

12. A hybrid vehicle with an internal combustion engine and an electric motor, with at least one electric motor which in a generator mode converts kinetic energy of the vehicle into electric power and which can provide a generator-created braking momentum $M_G$ or a respective braking power $P_G$ to the vehicle, wherein the vehicle is operable, when braking is requested with a target value $M_{Target}$ at a time $t_1$, to be provided with a total braking momentum $M_{Target}$ according to the following formula:

$$M_{Total}=M_G, \text{ if } M_{Target} \leq M_{Level}$$

$$M_{Total}=M_G+M_F, \text{ if } M_{Target} > M_{Level}$$

and wherein a constant offset value $M_{Offset} > 0$ is selected for the braking momentum $M_G$ at the time $t_1$, wherein $M_F > 0$ being a braking momentum provided to the vehicle by vehicle brakes, wherein the braking momentum $M_G$ is applied during a shifting pause $t_S$ during the shifting up of a manual transmission when the clutch is opened completely or partially, wherein the braking momentum $M_G$ during the shifting cause is determined based on a rotation of a motor camshaft $n_{Mot}$ and a rotation of an input shaft of a transmission $n_G$ in order to synchronize the rotation;

or wherein the vehicle is operable, when braking is requested at a time $t_1$ with a target value $P_{Target}$, to be provided with a total braking power $P_{Total}$ according to the following formula:

$$P_{Total}=P_G, \text{ if } P_{Target} \leq P_{Level}$$

$$P_{Total}=P_G+P_F, \text{ if } P_{Target} > P_{Level}$$

and wherein $P_G$ comprises a constant offset value $P_{Offset} > 0$, wherein $P_F > 0$ being a braking power provided to the vehicle by the vehicle brakes;

such that for positive positions of the brake pedal below a threshold position, the total braking momentum $M_{Total}$ is provided to the vehicle only by generator-created braking momentum $M_G$ and not by momentum from the vehicle brakes $M_F$, wherein the braking power $P_G$ is applied during a shifting pause $t_S$ during the shifting up of a manual transmission when the clutch is opened completely or partially, wherein the braking power $P_G$ during the shifting pause is determined based on a rotation of a motor camshaft $n_{Mot}$ and a rotation of an input shaft of a transmission $n_G$ in order to synchronize the rotation.

13. The method according to claim 12, wherein the braking momentum $M_G$ is impressed according to a predetermined formula from an initial value $M_{Offset}$ to a value $M^0$, at least within a time interval $t_1+$Delta t with Delta t selected from a value of 2 s, 1 s, 500 ms, or 100 ms.

14. The method according to claim 12, wherein a filtering of the braking momentum $M_G$ occurs according to a predetermined filter formula for suppressing variations of the braking momentum within a predetermined time interval $t_1+t_F$, with $t_F$ selected from a value of 2 s, 1 s, 500 ms, or 100 ms.

15. A method for operating a hybrid vehicle with an internal combustion engine, an electric motor, an accelerator pedal, and a brake pedal, with at least one electric motor in a generator mode converting kinetic energy of the vehicle into electric power and which can provide a generator-created braking momentum $M_G$ or a respective braking power $P_G$ to the vehicle, the method comprising:

detecting an accelerator pedal position;

detecting a brake pedal position;

if accelerator pedal position and the brake pedal position are in their respective initial positions, then providing an generator-created braking momentum $M_G = M_{Offset}$ or a respective braking power $P_G = P_{Offset}$ to the vehicle, wherein $M_{Offset}$ or $P_{Offset}$ are initial offset values with $M_{Offset} > 0$ or $P_{Offset} > 0$;

and increasing said generator-created braking momentum $M_G$ or said braking power $P_G$ depending on said brake pedal position, wherein the braking momentum $M_G$ or the braking power $P_G$ is applied during a shifting pause $t_S$ during the shifting up of a manual transmission when the clutch is opened completely or partially, wherein the braking momentum $M_G$ the braking power $P_G$ during the shifting pause is determined based a rotation of a motor camshaft $n_{Mot}$ and a rotation of an input shaft of a transmission $n_G$ in order to synchronize the rotation.

16. The method according to claim 15, wherein when braking is requested with a target value $M_{Target}$ at a time $t_1$, a total braking momentum $M_{Total}$ is provided to the vehicle according to the following formula:

$$M_{Total}=M_G, \text{ if } M_{Target} \leq M_{Level}$$

$$M_{Total}=M_G+M_F, \text{ if } M_{Target} > M_{Level}$$

wherein $M_F > 0$ being a braking momentum provided to the vehicle by vehicle brakes or wherein, when braking is requested at a time $t_1$ with a target value $P_{Target}$, the vehicle is provided with a total braking power $P_{Total}$ according to the following formula:

$$P_{Total}=P_G, \text{ if } P_{Target} \leq P_{Level}$$

$$P_{Total}=P_G+P_F, \text{ if } P_{Target} > P_{Level}$$

wherein $P_F > 0$ being a braking power provided to the vehicle by the vehicle brakes.

17. The method according to claim 15, wherein the offset value $M_{Offset}$ or $P_{Offset}$ is determined depending on an operational state of the vehicle.

18. The method according to claim 17, wherein the operational state is selected from the group consisting of: the vehicle speed, rotation of the camshaft of the internal combustion engine, at least one of coolant and oil temperature, a state of charge of an electric energy storage unit, the difference between a target value and an actual state of charge of the energy storage unit, and a value of vehicle deceleration.

* * * * *